United States Patent
Smith

(10) Patent No.: US 9,588,397 B1
(45) Date of Patent: Mar. 7, 2017

(54) SELF-SEEDING TO ENHANCE, STABILIZE, AND WAVELENGTH TUNE SUPERCONTINUUM GENERATION

(71) Applicant: Philip Gordon Smith, San Jose, CA (US)

(72) Inventor: Philip Gordon Smith, San Jose, CA (US)

( * ) Notice: Subject to any disclaimer, the term of this patent is extended or adjusted under 35 U.S.C. 154(b) by 0 days.

(21) Appl. No.: 15/012,857

(22) Filed: Feb. 2, 2016

(51) Int. Cl.
*G02B 26/08* (2006.01)
*G02F 1/35* (2006.01)
*G02B 26/00* (2006.01)
*G02B 27/14* (2006.01)

(52) U.S. Cl.
CPC ......... *G02F 1/3501* (2013.01); *G02B 26/007* (2013.01); *G02B 27/141* (2013.01); *G02F 2001/3503* (2013.01); *G02F 2001/3528* (2013.01)

(58) Field of Classification Search
CPC ........... G01N 21/6458; G01N 21/0032; G01N 21/0076; G02F 1/3532; G02F 1/3536; G02F 1/395; G02F 1/3501; G02F 2001/3503; G02F 2001/3528; G02B 26/007; G02B 27/141; G02B 26/08
USPC .................... 359/225.1, 328, 330; 259/459.1
See application file for complete search history.

(56) References Cited

U.S. PATENT DOCUMENTS 8,718,411 B2   5/2014  Austin et al.
2012/0292531 A1*  11/2012  Grudinin ............ G01N 21/6458
                                                            250/459.1

OTHER PUBLICATIONS

R.R.Alfano and S.L.Shapiro, Observation of self-phase modulation and small-scale filaments in crystals and glasses, Phys.Rev.Let., (1970), p. 592-594, v24, APS, USA.
Peter M. Moselund, et.al., Back seeding of picosecond supercontinuum generation in photonic crystal fibers, Photonic Crystal Fibers II, (2008), p. 69900P, v6990, SPIE, USA.
Peter M. Moselund, et.al., Back seeding of higher order gain processes in picosecond supercontinuum generation, Opt. Expr., (2008), p. 11954, v16(16), OSA, USA.
P.T.S.Devore, et.al., Stimulated supercontinuum generation extends broadening limits in silicon, Appl. Phys. Lett., (2012), p. 101111, v100, AIP, USA.
D.R.Solli, et.al., Demostration of stimulated supercontinuum generation—an optical tipping point, arXiv:0801.4066, (2008), Cornell Univ. Lib, USA.

* cited by examiner

*Primary Examiner* — Euncha Cherry

(57) ABSTRACT

A novel method for enhancing (for improved average power), stabilizing (to reduce rms noise), and wavelength tuning supercontinuum generation is described for numerous applications including but not limited to metrology, spectroscopy, and biomedical imaging. What is described is a way of enhancing only a small bandwidth portion of the optical spectrum by means of self-seeding in the supercontinuum. This cost-effective method allows for wavelength tuning while maintaining the enhancement.

2 Claims, 2 Drawing Sheets

SELF-SEEDING TO ENHANCE, STABILIZE, AND WAVELENGTH TUNE SUPERCONTINUUM GENERATION

BACKGROUND OF THE INVENTION

Supercontinuum generation has been described in detail elsewhere including each of the references cited above. It has been shown that in its raw form the supercontinuum generation process is started by noise which leads to inherently unstable output, both in the shape of the produced continuum's optical spectrum, and in the output power as measured at any given wavelength. It has also been shown that seeding the supercontinuum (with either a portion of the pump (see DeVore, et. al.), with the entire spectrum in a back seeded format (see Alfano, et. al. and Moselund, et. al.), or with a narrow bandwidth extracted from another supercontinuum (see Austin, et. al.)), will enhance the power and stability of the supercontinuum. The main problems with the proposed solutions to the unwanted artifacts are of course cost and complexity. What is claimed here is a novel method which is simple, elegant and cost effective, which is very easy to manufacture and use. Also, it is clear that even though this idea is simple (to someone after seeing the drawings presented), since no one experienced in the art, including the team(s) of inventors on the previous patent(s), have thought of it, the idea is also non-obvious.

SUMMARY OF THE INVENTION

The present application is directed to a novel way of enhancing the supercontinuum generation process through a self-seeded approach using a narrow bandwidth portion which was extracted from the supercontinuum itself. Specifically, this is an improvement over the previous patent by Austin, et. al., wherein there are three distinct differences. First, the supercontinuum in which the modified portion of the output of the first supercontinuum is introduced is actually the same exact supercontinuum in a self-seeding configuration; second, a much simpler method of generating the modified portion of the supercontinuum is shown; and third, the afore mentioned method for generating the modified portion of the supercontinuum is then used to wavelength tune the main output of the enhanced supercontinuum. In this more elegant approach, the overall enhancement of the supercontinuum is less costly than the supercontinuum generator itself leading to a significant cost savings over the methods presented in the previous patent (see Austin, et. al.). While there may be various embodiments of the idea presented here which one experienced in the art may be able to devise from this application, there is one specific embodiment that will be described below.

In this one embodiment, it is assumed that the process of generating the supercontinuum to start with is well known. Once the raw supercontinuum is formed, it is passed through or onto a dispersive element, passed through a slit to separate a small bandwidth of the supercontinuum and then passed through a beamsplitter. One portion of the split beam is then sent back to the original supercontinuum generator after it is optically delayed to allow it to be synchronous with the next pump pulse where it is used to self-seed the next pulse of the original supercontinuum generator. The main output of the entire apparatus is at the second arm of the above mentioned beamsplitter which followed the above mentioned slit. Once the enhanced supercontinuum is formed, it is possible to wavelength tune the main output by simply rotating the dispersive element in modifying the supercontinuum's spectrum.

BRIEF DESCRIPTION OF THE DRAWINGS

The presently described embodiment of the novel enhancement of supercontinuum generation is explained in more detail by way of the accompanying two drawings, wherein.

DETAILED DESCRIPTION OF THE INVENTION

Figure 1:
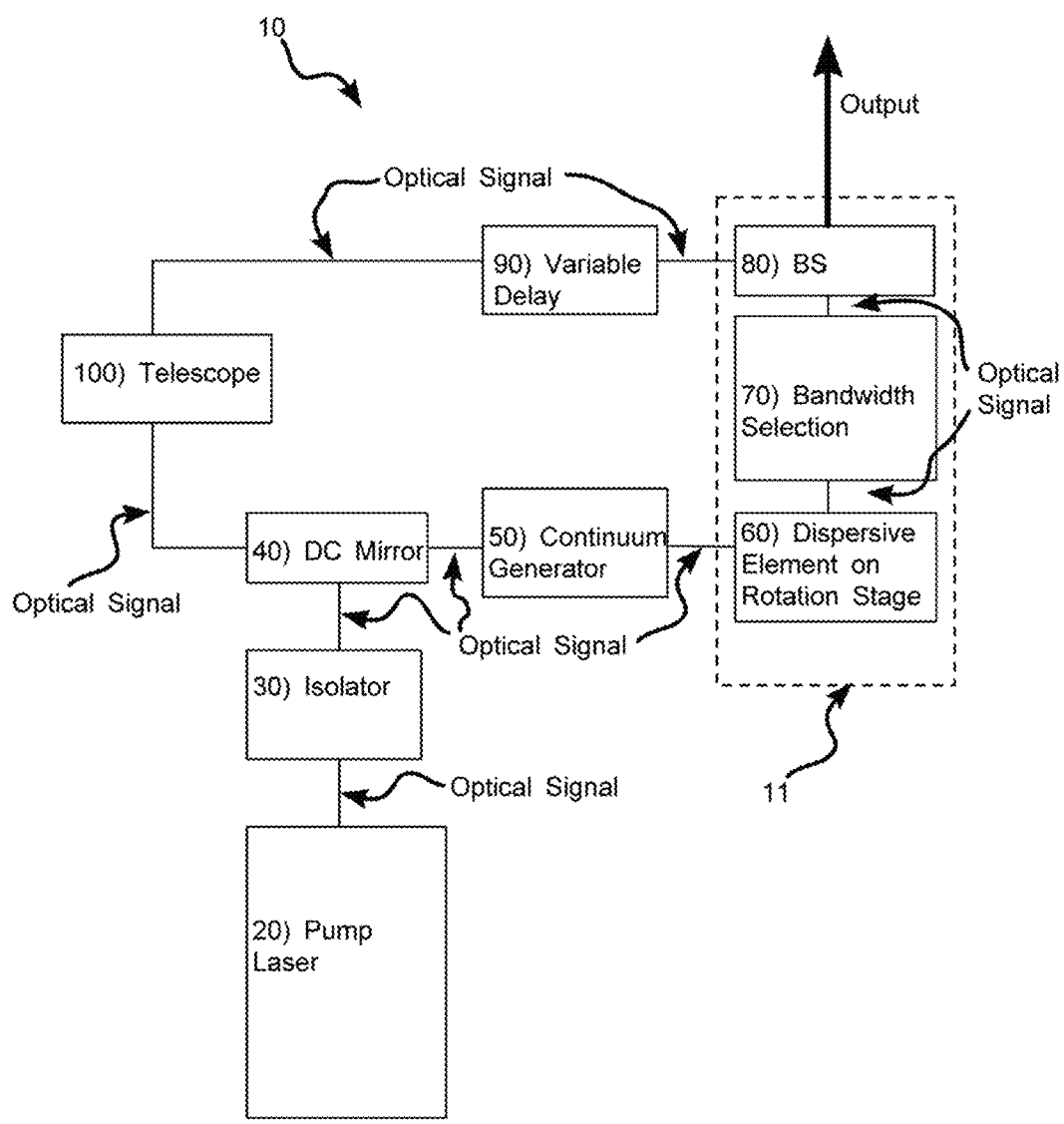
FIG. 1 shows a schematic block diagram of an embodiment of a self-seeded supercontinuum generator.

FIG. 1 shows an embodiment of an apparatus having a self-seeded supercontinuum generator. As shown in FIG. 1, the apparatus 10 includes a pump laser 20 having a pulse repetition rate of equal to or greater than 10 MHz (a lower repetition rate would make the delay line used for synchronization impractical), a pulse width of equal to or shorter than 100 picoseconds (longer pulsewidths would make it harder to get the needed high peak power used in generating the supercontinuum), and an average power high enough to generate a supercontinuum. Also shown in the apparatus 10 is a Faraday isolator 30 to minimize back-reflections that could damage the pump laser or add to instabilities in the overall output of the supercontinuum. After the isolator, the output of the pump laser is directed to the supercontinuum generator 50 by means of a dichroic mirror 40 which will later be used to inject the modified seed pulse. The supercontinuum generator 50 may be a crystal photonic fiber or any commonly used optical material which can generate a supercontinuum when high intensity laser pulses are passed through. Once the supercontinuum is generated in its raw form, it is passed through or directed off of a dispersive element 60 which is supported by a rotation stage. The dispersed optical spectrum is than directed towards a bandwidth selection 70, in this case a slit, which is adjusted and positioned in such a way as to let only a small bandwidth (<20 nm) of the spectrum to pass. A cylindrical lens is then used to collimate the emitted rays before a beamsplitter 80 is used pick off a fraction of the resulting beam. One arm of the beamsplitter 80 is sent through variable optical delay 90 and telescope 100 before it is reunited with the original pump beam at the dichroic mirror 40. The optical delay 90 is set to a position that allows the manipulated portion of the spectrum to be synchronized with the next pulse of the pump laser's pulse train, while the telescope 100 is set up in order to downsize the beam of the manipulated portion of the spectrum so it is equal to or slightly smaller than the original pump laser beam, for mode matching the two beams entering the supercontinuum generator 50. Once the now seeded output of the supercontinuum is formed, it continues along the original path to form a ring which is output on the second arm of the beamsplitter 80.

Figure 2:
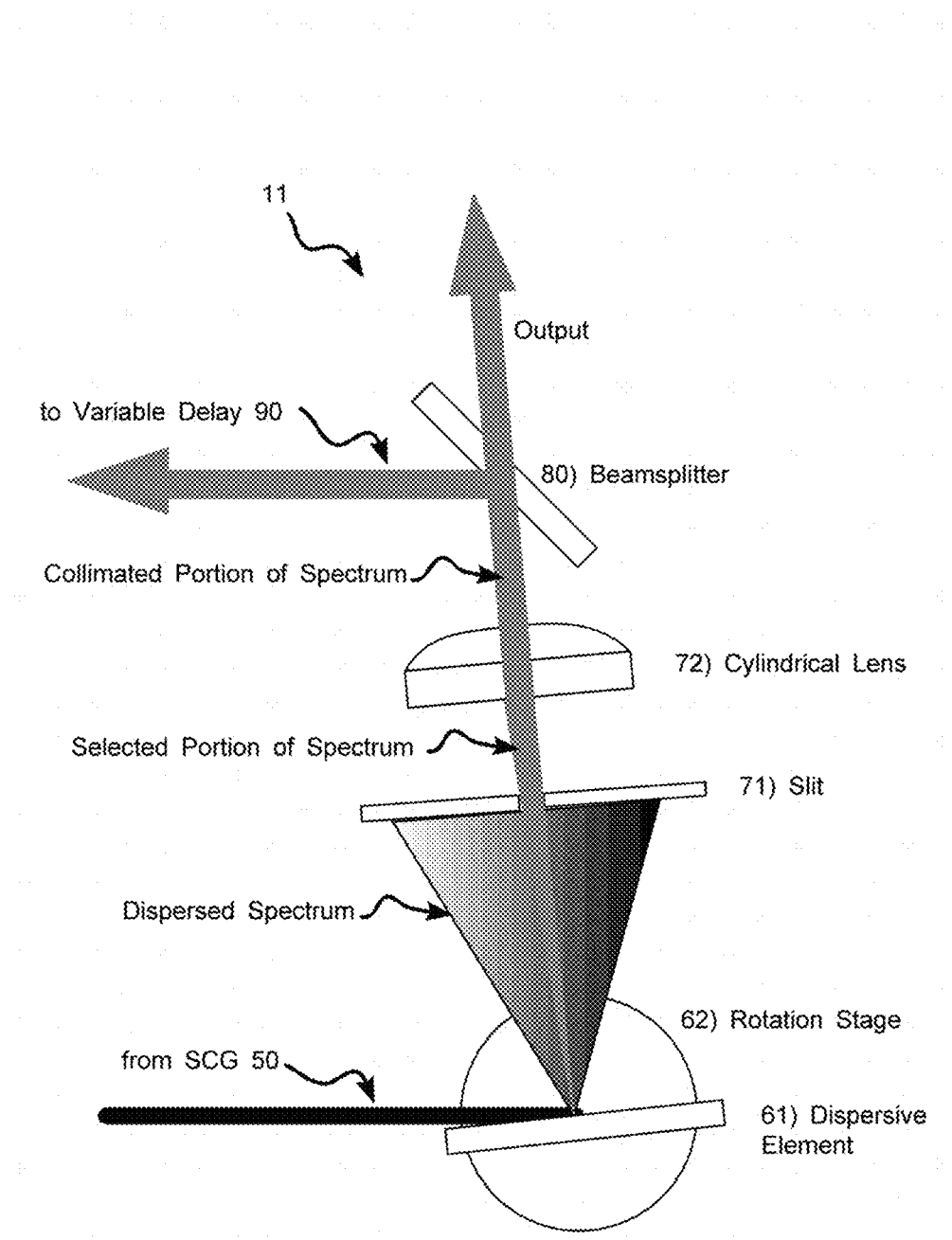
FIG. 2 shows a schematic diagram of the component that produces the spectrally narrow portion of the supercontinuum used in the self-seeding process.

FIG. 2 shows an embodiment of the component of the apparatus 11 (consisting of elements 60-80 of 10 from FIG. 1) which produces the spectrally narrow portion of the supercontinuum. This diagram is not to be considered a 1:1 scaled ray tracing of the embodiment, as some of the features have been enlarged for illustrative purposes. In this embodiment, the output of the supercontinuum generation process 50 is directed to the dispersive element 60; in this embodiment of the apparatus a diffraction grating 61 has been used, however a prism or other dispersive element may also be used. The a diffraction grating 61, is supported by a rotation stage 62 in such a way as the front face of the grating is directly over the rotational axis of the rotation stage such that the axis of rotation is orthogonal to the plane of the front face of the grating. Also important is that the position on the grating where the supercontinuum output is directed to is also directly over the rotational axis of the rotation stage, such that the optical path of the output after the slit 71 is not affected by the rotation of the stage 62. The subsequent dispersed spectrum of the supercontinuum is allowed to travel to the slit 71 where a small bandwidth of the spectrum is selected. This selected portion of the spectrum is now still diverging and must be collimated by a cylindrical lens 72. Once the selected portion is collimated, it is then directed to a beamsplitter 80 where a percentage of the beam (one arm) is sent to the variable delay 90 and the rest (the second arm) is sent off as the main output.

When the apparatus as described above is used the result is a tunable output of the supercontinuum generator which is higher in average power than would be generated without the seeding in place as measured at the main output position of the device. It is important to compare the average power at this location since someone using the output of the supercontinuum generator for the applications needing tunable output will need to extract a small bandwidth portion of the supercontinuum's full spectrum. Also resulting from the enhancement will be a significant reduction in rms noise on the tunable output. Finally, when implemented properly as described, the resulting enhanced output will be tunable in wavelength by simply rotating the stage 62 that supports the dispersive element 61, with the enhancement following as the wavelength is tuned.

The invention claimed is:

1. A method for enhancing the output of a supercontinuum generator comprising the following steps:
taking the output of the supercontinuum generator, and modifying it by creating a spectrally narrow portion which is then redirected into said supercontinuum generator (as opposed to a second supercontinuum generator) in a self-seeding configuration.

2. A method for tuning the wavelength of the main output of the method in claim 1 by adjusting the dispersive element used to modify the supercontinuum spectrum mentioned in claim 1.

* * * * *